United States Patent [19]

Schneider et al.

[11] Patent Number: 4,724,892

[45] Date of Patent: Feb. 16, 1988

[54] MOLD ASSEMBLY AND FABRICATION THEREOF WITH A SELF-SETTING URETHANE ADHESIVE PASTE SYSTEM

[75] Inventors: James T. Schneider, Powell; Albert L. Haugse, Dublin, both of Ohio

[73] Assignee: Ashland Oil, Inc., Russell, Ky.

[21] Appl. No.: 44,098

[22] Filed: Apr. 30, 1987

Related U.S. Application Data

[62] Division of Ser. No. 756,632, Jul. 19, 1985, Pat. No. 4,692,479.

[51] Int. Cl.$^4$ .................... B22D 33/04; B22C 9/04
[52] U.S. Cl. ..................... 164/137; 164/339; 164/349
[58] Field of Search ............... 523/142, 143; 164/137, 164/339, 349

[56] References Cited

U.S. PATENT DOCUMENTS

| | | | |
|---|---|---|---|
| 3,409,579 | 11/1968 | Robins | 523/143 |
| 3,676,392 | 7/1972 | Robins | 523/143 |
| 3,702,316 | 11/1972 | Robins | 523/143 |
| 3,905,934 | 9/1975 | Gardikes | 164/43 |
| 3,925,296 | 12/1975 | Stone et al. | 523/143 |
| 4,179,427 | 12/1979 | Gardikes | 523/143 |
| 4,507,408 | 3/1985 | Torbus et al. | 524/143 |
| 4,540,924 | 9/1985 | Donnavant et al. | 23/143 |
| 4,552,197 | 11/1985 | Mills | 164/137 |
| 4,556,097 | 12/1985 | Burmeister | 164/137 |

*Primary Examiner*—Allan M. Lieberman
*Attorney, Agent, or Firm*—David L. Hedden

[57] ABSTRACT

An adhesive paste composition containing in admixture a resin component, a hardener component, a hydrophobic filler component and a curing agent. The resin component includes a polyol having at least two hydroxyl groups and the hardener component includes a liquid polyisocyanate containing at least two isocyanate groups. The admixture may be made by mixing together a premixed resin component contianing a filler and a catalyst and a premixed hardener component containing a hydrophobic filler. The fluid in the resin component, the hardener component, or both may be a thixotropic agent.

10 Claims, 4 Drawing Figures

MOLD ASSEMBLY AND FABRICATION THEREOF WITH A SELF-SETTING URETHANE ADHESIVE PASTE SYSTEM

This application is a division of application Ser. No. 756,632, filed July 19, 1985, now U.S. Pat. No. 4,692,479.

TECHNICAL FIELD

The present invention relates to adhesive paste compositions, and to methods for making, curing and using such adhesive paste compositions. The paste compositions of the present invention are especially useful for bonding together foundry shapes, such as cores and molds, so as to assemble these shapes into a molding assembly for casting liquid metals. These paste compositions are particularly advantageous in their ease of application to foundry shapes, and in the control that they provide over the gel time in which the foundry shapes must be assembled together and the short curing times before this molding assembly can be used for casting a metal. More particularly, the invention relates to a two-package or three-package adhesive system that can be readily mixed and applied on site. When these components are mixed, the resulting paste is a true chemically-curing adhesive exhibiting rapid chemical curing requiring no heat and no extended drying times to achieve a high tensile strength cure.

BACKGROUND OF THE INVENTION

U.S. Pat. Nos. 3,409,579 and 3,676,392 disclose binder compositions for aggregate mixtures such as foundry mixes for making cores, molds and other foundry shapes for casting metal. The entire contents of each of these U.S. patents are incorporated herein by reference. These binder compositions may be supplied as two-package systems comprising a resin component in one package and a hardener component in the other package. The resin component comprises an organic solvent solution of phenolic resin. The hardener component comprises a liquid polyisocyanate having at least two isocyanate groups per molecule. At the time of use, the contents of the two packages may be combined first and then mixed with the sand aggregate, or preferably the packages are sequentially admixed with sand aggregate. After a uniform distribution of the binder on the sand particles has been obtained, the resulting foundry mix is molded into the desired shape for subsequently casting a metal shape.

In U.S. Pat. No. 3,409,579, the molded shape is cured by passing a gaseous tertiary amine through it. In U.S. Pat. No. 3,676,392, curing is effected by means of a base having a pK value in the range of about 7 to about 11 as determined by a method described by D. D. Perrin in Dissociation Constants of Organic Bases in Aqueous Solution (Butterworths, London 1965). The base is introduced originally into the resin component before it is mixed with hardener, or it may be introduced as the third component of a three-package binder system comprising in separate packages the resin component, the hardener, and the base.

In both U.S. Pat. Nos. 3,409,579 and 3,676,392, the preferred phenolic resins contain benzylic ether resins along with other reaction products. Benzylic ether resins are condensation products of a phenol with an aldehyde where the phenol has the general formula:

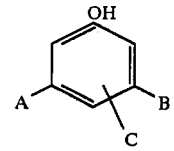

wherein A, B, and C are hydrogen, hydrocarbon radicals, oxyhydrocarbon radicals, or halogen, and where the aldehyde has the general formula R'CHO wherein R' is a hydrogen or a hydrocarbon radical of 1 to 8 carbon atoms, prepared in the liquid phase at temperatures below about 130° C. in the presence of catalytic concentrations of a metal ion dissolved in the reaction medium. The preparation and characterization of these resins is disclosed in greater detail in U.S. Pat. No. 3,485,797, the entire contents of which is incorporated herein by reference. The phenolic resin component of the binder composition is, as indicated above, generally employed as a solution in an organic solvent.

The second component or package of the binder composition comprises an aliphatic, cycloaliphatic, or aromatic polyisocyanate having preferably from 2 to 5 isocyanate groups. If desired, mixtures of polyisocyanates can be employed. Less preferably, isocyanate prepolymers formed by reacting excess polyisocyanate with a polyhydric alcohol, e.g., a prepolymer of toluene diisocyanate and ethylene glycol, can be employed. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 2,4- and 2,6-toluene diisocyanate, diphenylmethane diisocyanate, and dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenyl isocyanates, chlorophenylene-2,4-diisocyanate, and the like. Although all polyisocyanates react with the phenolic resin to form a cross-linked polymer structure, the preferred polyisocyanates are aromatic polyisocyanates and particularly diphenylmethane diisocyanate, triphenylmethane triisocyanate, and mixtures thereof.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80% by weight of the solution.

The bench life of an aggregate binder can be defined as the maximum permissible time delay between mixing the binder components together with an aggregate such as sand and the production of acceptable products therefrom by at least partial curing. In order to extend the bench life of the above binder systems before they are contacted with the catalytic component, various materials have been suggested. Phthaloyl chloride, acid halides, phosphorus compounds and other bench life extenders are currently being commercially employed for such purposes. Great improvements in bench life have been obtained through the use of phosphorus halides as described in copending application Ser. No. 575,208, and phosphorus based acids as described in copending application Ser. No. 599,106.

Attempts have been made in the past to use adhesive compositions similar to the foregoing binder compositions to bond together foundry shapes of the type described and associated metal molds into a composite molding assembly. As used in this specification, the term "foundry shape" means molding shapes made of aggregate foundry mixes, such as cores and molds, and molding shapes made of other materials, such as metal shells and other metal molding parts for casting metal shapes. Shapes for molding plastic materials also are intended to be included within the meaning of this term.

Such prior art uses of binder type compositions as foundry shape adhesives have encountered various problems and have resulted in a number of deficiencies. These problems and deficiencies include difficult to control gel times and cure times, difficulties in application due to the Part I component (resin) being too viscous and the Part II component (hardener) being too thin (overly fluid). Such substantial differences in viscosities between the Part I and Part II components also result in poor mixing characteristics leading to unpredictable gel and curing times. Prior art systems also were deficient in requiring mixing ratios between the Part I and Part II components other than 50:50, such as 60:40. Such unequal mixing ratios between the parts make it difficult to maintain proper curing relationships between the reactants at the time of application, which again makes for unpredictable gel and curing times and limits the types of application equipment that can be used. A further deficiency of the prior art was that it was extremely difficult to precatalyze either of the components so that the catalyst had to be added as a third component at the application site. While some precatalyzation of the resin component was possible, this precatalyzed resin generally had an unacceptable shelf-life (less than a one month) due to a lack of stability of the premixed ingredients. Other deficiencies included unworkable consistencies, foaming and other characteristics causing dimensional changes after application, low tensile strengths, resoftening with heat, deterioration of adhesive upon water absorption, and the like.

Other prior art practices include the use of relatively expensive hot melt adhesives which are prone to thermal instability (resoftening or other loss of tensile strength) when subjected to heat from the molten metals being cast or other processing operations subjecting the molding assembly to heat. Hot melt adhesives also may resoften upon core wash and over drying of the parts. Such thermal instability allows the glued parts to shift, thereby ruining the tolerances of the casted metal piece. Softening of the adhesive also may result in run out of the molten metal, which similarly may destroy the tolerances of the casted pieces. Run out is due to an inadequate adhesive seal between the molding assembly parts and also may result from an improper consistency of the applied adhesive. Another problem with hot melt adhesives is they are expensive and hazardous to handle and the equipment used for their application is subject to considerable down time and maintenance.

Prior practices also include the use of air or oven dried adhesives. This class of adhesives is slow to cure and therefore significantly limits production rates. A delay of sometimes as much as 10 to 15 hours after gluing the parts of the molding assembly together may be necessary before molten metal can be poured into such an assembly. It has long been recognized that the elimination of such time delays would significantly increase production rates. In lieu of any type of adhesive, prior art practices also include the use of metal fasteners to hold the foundry shapes together during the metal casting operation. However, such metal fasteners are expensive to provide and time consuming to apply. In addition to metal fasteners, weights attached to the molding assembly were sometimes required in order to help hold the assemblied parts together during the casting process.

Although two part adhesive pastes have been used in the past, the resin component had an extremely high viscosity (about 50,000-60,000 cps) and the isocyanate component had an extremely low viscosity (about 200-300 cps). These very great differences in viscosities caused difficulties in mixing and application of the final adhesive composition. For example, it is very difficult to feed two components with such widely varying viscosities through a common applicator gun and properly control the mixing ratios because the viscosity differences result in substantial variations in pumping pressures and flow rates. Prior art applicator systems also required auxiliary solvent flush systems to remove blockages caused by improper mixing of the hardener component and/or interim delays in adhesive application.

DISCLOSURE OF THE INVENTION

A number of requirements have been recognized for the use of adhesive pastes in making foundry molding assemblies. These requirements include the need for separate resin and isocyanate components each having a viscosity in the range of about 20,000 to about 50,000 centipoise (cps). The need for this consistency is that it is desirable to apply the admixture by extrusion through a single applicator gun having a mixing chamber a short distance upstream of an outlet nozzle. A paste in this consistency range can be readily mixed and extruded through such an applicator using pressures in the range of about 20 to 100 psi. Another requirement is that the paste have a time period of workability (gel time) of at least two to three minutes. It also is desirable to have a cure time over which the paste reaches at least 70-80% of its final tensile strength in about 10-30 minutes after application to a foundry shape. This intermediate tensile strength preferably is in the range of about 100 to 150 psi, preferably at least about 125 psi.

A further requirement of a mold assembling paste is that it adhere well both to metal mold parts and to the foundry mix compositions used in making mold assembly cores. Such mold assembly cores and other parts after adhesion to each other may be treated by dipping in a water based solution, and then heated to a temperature of about 275° F. for about one hour after assembly. Accordingly, the adhesive paste must resist breakdown under the conditions of both such water treatment and subsequent drying.

The present invention meets the foregoing requirements for a satisfactory adhesive paste for molding assemblies and overcomes the deficiencies discussed above regarding prior art adhesive compositions and other techniques for fastening together foundry shapes into a composite molding assembly. The adhesive paste of the present invention is a two or three part polyol resin system capable of gluing or "cementing" together foundry shapes, such as sand cores, sand molds, and metal core and mold pieces, at room temperature. The mixed paste is applied as a continuous "bead" or as discontinuous "spots" to appropriate surfaces of core and/or mold pieces using mixing and applicator equipment of conventional design. The coated surfaces of adjacent pieces are then pressed and held together until the paste "sets".

The adhesive paste is easily mixed in a one to one ratio of the resin component (Part I) and the isocyanate component (Part II). The mixing ratio is not particularly critical since it may vary between about 45:55 and about 55:45. The mixed paste remains in the form of a workable liquid for about 20% to about 60%, preferably about 40% to about 50% of its curing time, depending on the catalyst used. This provides working time for applying the paste, positioning the pieces to be assembled, and then pressing together the pieces into the molding assembly. The glued assembly then cures to form a thermally stable, securely bonded molding assembly into which or around which a molten metal may be poured for casting metal shapes.

Although it has been known heretofore that isocyanates react with phenolic resins to result in cross-linked materials, it has been difficult to obtain cross-linked materials having acceptable properties. This has been particularly true where such mixtures of phenolic resins and polyisocyanates are employed for gluing together foundry shapes. In the absence of uniform mixing of the components, the resulting molding assemblies require long cure times, have low tensile strengths and are also deficient in other mechanical properties. These deficiencies are overcome by the compositions of the present invention which combined the use of particular types of polyol resins, particular polyisocyanate hardeners, particular base catalysts, particular filler materials and particular solvent systems.

In addition to catalytic activity causing curing at room temperature, the base catalysts of the present invention add a highly surprising and desirable property to the adhesive compositions. Most cold-curable adhesive compositions combine long gel times with long cure times or short cure times with short gel times. The resin compositions of the present invention for reasons not clearly understood combine long gel times with relatively short cure times which result in superior application properties in the liquid adhesive and superior mechanical properties in the cured product.

The adhesive compositions of a the present invention are generally made available as a two-package system comprising the polyol resin component in one package and the polyisocyanate hardener component in the other package, both components being in liquid form and having relatively high viscosities. In general, the catalyst is incorporated into the resin component although such is not essential. At the time of use, the contents of the two packages are combined and used in the intended application. The time of workability before the composition gels (gel time) and the time required for curing will vary with the amount of catalyst and with the nature of the base catalyst, more particularly the pK value of the catalyst. Although the adhesive compositions of the present invention are particularly designed to achieve curing at room temperature, it is to be understood that these adhesive compositions also can be cured by baking at elevated temperatures.

The adhesive paste composition of the invention comprises in admixture a resin component, a hardener component, a hydrophobic filler component and a curing agent. The resin component (Part I) includes a polyol having at least two hydroxyl groups and the hardener component (Part II) includes a liquid polyisocyanate having at least two isocyanate groups. The hydrophobic filler is preferably a thixotropic agent and is preferably premixed with the hardener component. The resin component also preferably includes a filler which is preferably hydrophobic, although it need not be. The filler in the resin component also is preferably a thixotropic agent.

In the two component systems described, the filler component is preferably dispersed in both the polyol and the isocyanate components. However, the placement of the filler component in the resin component of the system depends on the viscosity desired for that component. The viscosity of each component should be such that the filler does not separate out upon prolonged standing in storage. The viscosity of both the polyol component and the isocyanate component should be in the range of 7,000 to 60,000 cps, preferably 20,000 to 50,000 cps, more preferably 30,000 to 40,000 cps. The stability should be such that the filler does not cause any adverse or premature reaction with the other constituents of the component in which it is placed. For example, a filler that contains water molecules or an ingredient that reacts to produce water molecules should not be placed in the isocyanate component since isocyanates undergo a cross-linking reaction with water.

Both the Part I and Part II components preferably contain as the filler component a hydrophobic fumed silica which is a thixotropic agent. The amount of this thixotropic agent blended with each part is sufficient to provide the resin component and the hardener component with similar viscosities. The similarity in viscosities between the Part I and Part II components solves many of the problems inherent in the prior art technology discussed above. In addition, the relative ratio of Part I to Part II is approximately 50:50 by weight, which can vary between about 55:45 and about 45:55. This means that approximately the same amount of Part I and Part II are mixed to yield the final core paste adhesive to be applied to foundry shapes and this greatly increases the reliability of the final mix with respect to its gel and curing times. Both the similarity of viscosities and the equal mixing of Parts I and II contribute to the ease of mixing and the workability of the admixture so that conventional mixing and application equipment can be used for the adhesive paste of the invention.

Although the adhesive system can be sold as a three part system in which the catalyst is mixed with the Part I and Part II components at the foundry site, the adhesive system is preferably supplied as a two part system in which the catalyst is premixed with the Part I component. In this instance, the catalyst is premixed with the Part I component at the site of the manufacturer of the resin component. The premixed catalyst is preferably a delayed action catalyst based on a strong cyclic amine, such as a blocked 1,8-diazo-bicyclo 5,4,0 undecene 7.

Accordingly, a curing agent is dissolved in the polyol component of the preferred two part system. Alternately, the curing agent may comprise a third component separately packaged so as to be mixed simultaneously with both or premixed with either of the two other components just prior to application of the paste admixture to mold and/or core pieces. In this alternative, the catalyst may be a liquid tertiary amine or other conventional catalyst having a relatively slow but appreciable reaction rate with the polyol alone.

The hardener component comprises liquid aliphatic, cycloaliphatic, or aromatic polyisocyanates having preferably from two to five isocyanate groups. If desired, mixtures of organic polyisocyanates can be employed. The preferred polyisocyanates are aromatic polyisocyanates, particularly a mixture of diphenyl and triphenyl polyisocyanates.

The polyol resin component may include a phenolic resin which comprises reaction products of a phenol with an aldehyde. The aldehyde has the formula R'CHO wherein R' is a hydrogen or hydrocarbon radical of 1 to 8 carbon atoms. The phenol has the general formula:

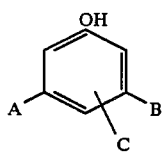

wherein A, B and C are hydrogen atoms, or hydroxyl radicals, or hydrocarbon radicals, or oxyhydrocarbon radicals, or halogen atoms, or combinations of these. This phenol may be a multiple ring phenol such as bisphenol A. At least about 5 mole percent, more preferably about 5 to about 30 mole percent, of the phenol reactants employed in making the phenolic resin component may be a substituted phenol such as an alkyl phenol, more preferably nonyl phenol, most preferably para-nonyl phenol. The phenolic resin is preferably non-aqueous. By "non-aqueous" is meant a phenolic resin which contains water in amounts of no more than about 10%, preferably no more than about 5%, and more preferably no more than about 1% based on the weight of the resin. The phenolic resin component preferably includes benzylic ether resins. Methylol-terminated phenolic resins also may be used.

By "phenolic resin" is meant the reaction products of a phenol with an aldehyde in which the final mixture of molecules in the reaction products is dependent upon the specific reactants selected, the starting ratio of these reactants, and the conditions of the reaction (for example, the type of catalyst, the time and temperature of the reaction, the solvents and/or other ingredients present, and so forth). The reaction products, that is, the phenolic resin, will be a mixture of different molecules and may contain in widely varying ratios addition products, condensation products, and unreacted reactants such as unreacted phenol and/or unreacted aldehyde. By "addition product" is meant reaction products in which an organic group has been substituted for at least one hydrogen of a previously unreacted phenol or of a condensation product. By "condensation product" is meant reaction products with two or more benzene rings.

The present invention also is concerned with securing together foundry cores and molds so as to fabricate a molding assembly. Such cores and/or molds may comprise a foundry mix containing foundry aggregate with a bonding amount of up to about 10% by weight of the prior art binder composition described hereinabove based upon the weight of the aggregate. The foundry mix is introduced into a pattern and hardened to become self-supporting. The shaped foundry mix is removed from the pattern and allowed to further cure to thereby obtain a hard, solid, cured foundry shape. These foundry shapes then are secured together or to mold pieces of metal to fabricate a molding assembly.

Furthermore, the present invention is concerned with a process for casting a metal. The process comprises fabricating a molding assembly as discussed hereinabove and pouring the metal while in the liquid or molten state into or around the assembly. The metal is allowed to cool and solidify and the molded metal article is then separated from the molding assembly.

The adhesive paste of the present invention has numerous advantages over adhesive pastes of the prior art for similar applications. With respect to the present invention, the ratio of Part I to Part II can be consistent at all times during application of the mixed adhesive to the foundry shapes being used to assemble the molding assembly. The desired composition of the admixture can be achieved very quickly upon start up of the dispensing operation due in large measure to the 50:50 ratio at which the Part I and Part II components can be mixed. A further feature of the invention is that the mixing ratio may vary between 45:55 and 55:45 without a significant deterioration of adhesive performance. The adhesive may be applied with a highly portable dispensing gun having self-contained cartridges or chambers for each part, or in a dispensing gun having two flexible supply conduits for ease of movement but having some restrictions on portability as defined by the length of the hose or hoses providing these conduits. The dispensing gun is operable with one hand because core and mold assembling operations require foundrymen to dispense adhesive with one hand while setting cores and mold pieces with the other.

Because the viscosity of each part is approximately equal at the time of mixing and is selected to permit ease of pumping, flow surges are substantially eliminated, thereby avoiding unexpected changes in mixing ratios. Furthermore, the new adhesive does not require special solvent flushing equipment and operations using a separate solvent component as do certain prior art pastes. With the new adhesive system, flushing is accomplished by continuing to dispense the Part I component after shutting off the Part II component for a period of time sufficient to remove all Part II component from the dispensing equipment.

Another advantage of the present invention is that gel and cure times may be adjusted up or down according to the needs of the particular core and mold assembling operation. This depends upon the amount and type of catalyst used and can be accomplished either at the point of manufacture of the adhesive system or on site at the foundry using the adhesive. Cure times may be within the range of two minutes to several hours, preferably five minutes to fifty minutes, more preferably, five minutes to fifteen minutes. Gel times during which the adhesive remains workable are about 20% to about 60% of the cure time, preferably about 40% to 50% of the cure time.

In prior art core pastes, the resin component was extremely viscous while the hardener component was extremely liquid. The present invention brings the viscosity of the hardener component and the viscosity of the resin component substantially together. The viscosity of the hardener component may be in the range of 7,000 to 60,000 cps, preferably in the range of 20,000 to 50,000 cps, and more preferably in the range of 30,000 to 40,000 cps. The viscosity of the resin component, as well as the final admixture, is in the same ranges. These viscosity characteristics of the Part I and Part II components significantly increase mixing efficiency and the flowability of the mixed paste during application, while maintaining desirable levels of "standing power" or height of repose after application to a surface.

Adhesive paste for foundry use must be of sufficiently high viscosity when at rest (absence of shear) to repose high enough to ensure that the adhesive bead or spots will fully and sealingly contact the opposing surfaces to be glued together where these surfaces are somewhat rough and uneven. The thixotropic behavior of the preferred adhesive composition provides a high repose or "standing" viscosity at rest for providing a continuous seal between glued surfaces, and a substantially lower (as much as 50% or more) viscosity under shear for ease of mixing and application. On the other hand, the at rest viscosity of the mixed adhesive paste must not be excessively high so as to hinder the blending and mixing of the Part I and Part II components or the positioning of the molding assembly pieces to be joined together in close proximity. Interference with the positioning of the pieces to be joined will result in improperly dimensioned metal castings caused by an unusually large separation or gap between the pieces being joined.

Unacceptable separations or gaps between the mold assembly pieces may also be caused by foaming or other swelling of the mixed adhesive composition. In this regard, there is no substantial swelling of the adhesive admixture of the present invention. In other words, the amount of swelling, if any, is not sufficient to cause appreciable separation or gaps between the mold assembly pieces or improperly dimensioned metal castings.

Without intending to be bound by any one theory to explain the results achieved, it is believed that the use of a hydrophobic filler, preferably a thixotropic agent such as a chemically treated fumed silica, in both the resin component and the hardener component provides both of these parts with desirable viscosity characteristics without adversely affecting their shelf life. Similar viscosities combined with an increase in solids content and thixotropic behavior are believed to improve both mixing and application efficiency and allows the components to be mixed in a 1:1 ratio by weight. The use of a delayed action cyclic amine, preferably a blocked 1,5-diazobicyclo 5,4,0 undecene 7, as the catalyst, is believed to contribute significantly to stabilizing and increasing the shelf life of the resin component in a two part system where the resin component is precatalyzed. All of these features are believed to contribute to eliminating prior art problems with swelling of the applied adhesive.

The present invention therefore provides a high-performance, two-part adhesive paste for assembling foundry shapes, such as cores and molds, into molding assemblies. The strength of the adhesive bond achieved between the foundry shapes is sufficient to eliminate the use of mechanical fasteners, weights and other mechanical hardware for holding the shapes together during the casting of liquid metal. The high tensile strength, heat resistance, and swelling resistance of the cured adhesive paste prevents slipping or shifting of the foundry shapes during oven treatment and metal pouring. The adhesive paste can be readily applied as spots or beads according to the job requirements. Conventional equipment can be used to meter, mix and apply the proper amounts of adhesive. The equipment used in combination with the adhesive paste also can be easily adapted to either manual or remote control operation.

The adhesive paste of the invention is useful at or near room temperature (60° F.-80° F.). Accordingly, no ovens or lengthy drying times are required for sufficient curing to achieve the desired tensile strengths for handling the molding assembly. The adhesives can be supplied to the end user with differing cure times in order to accommodate different job requirements. In this regard, higher temperatures will shorten gel and cure times while colder temperatures will extend gel and cure times. Colder temperatures also may increase viscosity so care must be taken not to unduly restrict flow through pumping mechanisms and applicator conduits.

The tensile strength of the cured adhesive paste of the invention is generally stronger than the binder composition used to form cores and mold pieces from a sand aggregate. Thus, the molding assemblies can be handled without failure of the adhesive paste. Similarly, core and other washes of the foundry shapes will not adversely effect the tensile strength of the adhesive joint. Such high tensile strengths can be achieved within minutes to fractions of an hour, depending on the cure time selected. The tensile strength is high enough to eliminate the need for mechanical fasteners or weights. The rapid cure times available significantly improve productivity of the foundry operation. The adhesive paste will not resoften during post assembly operations such as washing and oven drying.

Virtually all types of cores and molds can be assembled with the adhesive paste regardless of the binder used in making the cores or mold pieces from aggregate such as sand. These cores and molds can be almost of any size or shape. The molding assemblies made from these foundry shapes might include impeller core assemblies, cylinder block barrel core assemblies, oil pump core assemblies, water jacket core assemblies, and intake manifold core assemblies for combustion engines.

BRIEF DESCRIPTION OF THE DRAWINGS

The invention may be understood further with reference to the accompanying drawings in which.

BEST AND OTHER MODES FOR CARRYING OUT THE INVENTION

Figure 1:
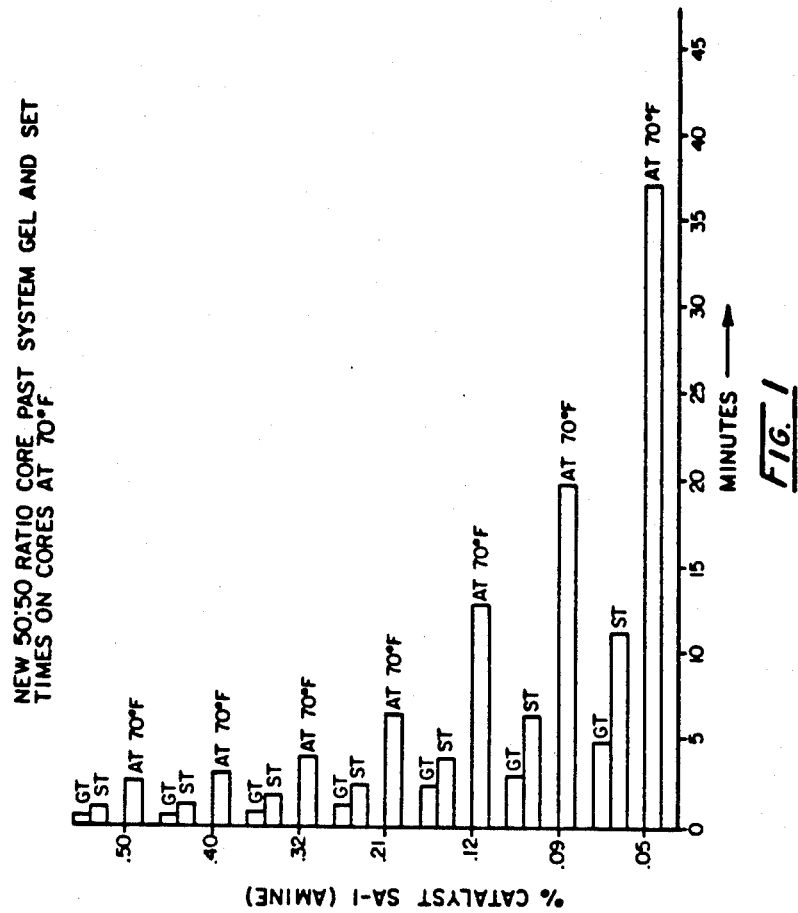
FIG. 1 is a bar graph illustrating gel and cure times at different catalyst concentrations for an adhesive paste made according to the invention.
Figure 2:
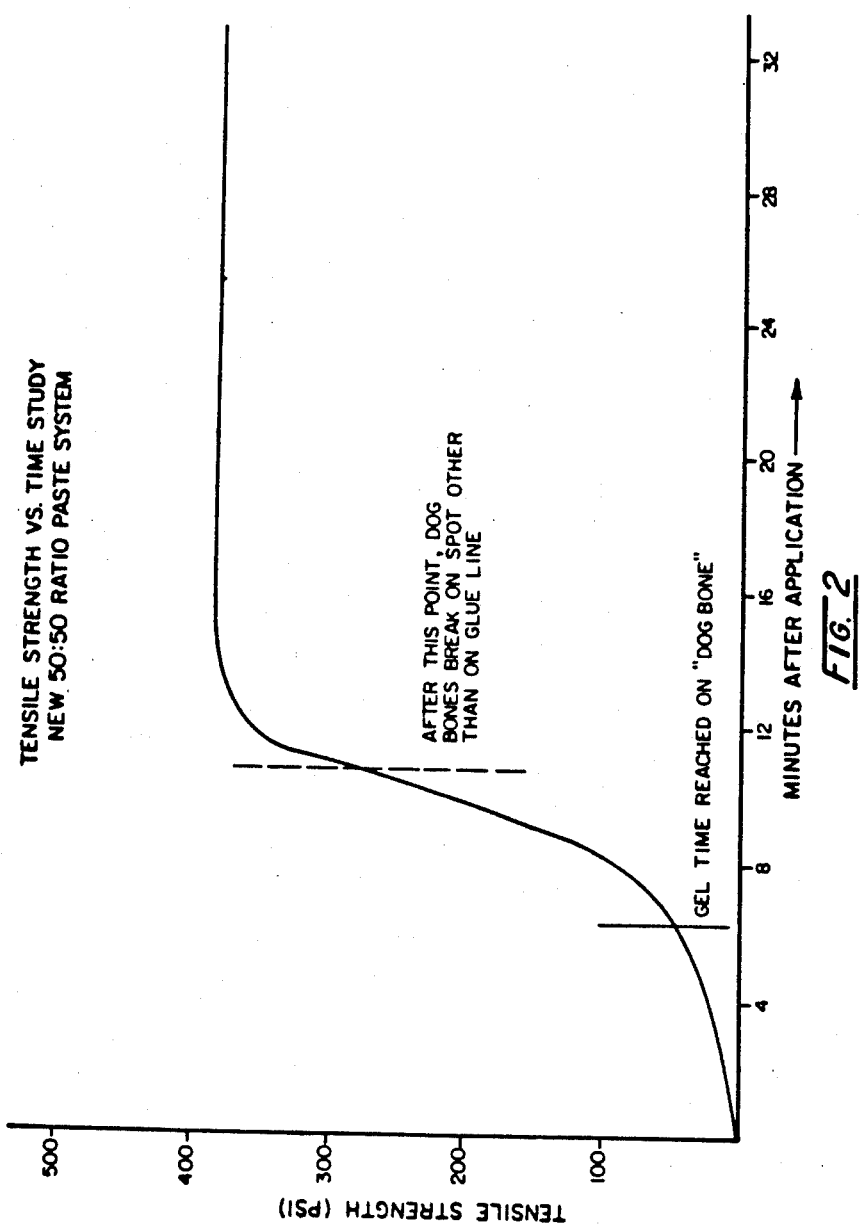
FIG. 2 is a graph illustrating the increase in tensile strength with time of an adhesive composition made in accordance with the invention.

The adhesive paste composition of the present invention contains a hydrophobic filler material. The hydrophobic filler employed can be an inorganic or organic particulate material which has sufficient hydrophobic characteristics. By "hydrophobic" is meant that the individual solid particles of the filler material adsorb substantially no water. By "substantially no water" is meant that the surface of each particle adsorbs less than about 1%, preferably less than about 0.75%, and more preferably less than about 0.5% of water by weight at a relative humidity of at least about 90% or greater.

A particularly important feature of the invention is that the hardener component of the two component system contains a hydrophobic filler in the amount of about 0.5% to about 20%, preferably about 1.0% to about 10%, and more preferably about 1.5% to about 5%, relative to the weight of this component. A preferred hydrophobic filler is a hydrophobic fumed silica such as Cab-O-Sil N-70-TS available from the Cabot Corporation of Tuscola, Ill. Such fumed silicas may be made by the hydrolysis of silicon tetrachloride at about 1,100° C. so as to produce colloidal silica particles of high purity. Such colloidal silica is generally known as "fumed" silica because of the high flame temperature used in this process. By "high purity" is meant that the silica is 99% by weight silicon dioxide with no measurable calcium, sodium or magnesium. The surface area of a fumed silica such as N-70-TS is about 100±20 square meters per gram. The fumed silica is made hydrophobic by treating it with a compound capable of substantially decreasing its water adsorbance. Such compounds include organosilicone compounds such as silane. A particularly preferred silane is polydimethyl siloxane. The individual fumed silica particles have a nominal particle size in the range of about 0.007 to about 0.012 microns.

Preferably, a filler material is also employed in the resin component of the two component system. Although the preferred filler for the resin component is a hydrophobic filler of the same type as used in the hardener component, the resin filler need not be hydrophobic. Examples of other fillers acceptable for the resin component include a hydrophyllic fumed silica such as M-5 available from the Cabot Corporation, bentonite clays preferably treated with a quaternary ammonium compound (such as SD-2 available from N.L. Industries of Hightstown, N.J.), bis-diethylene glycol terephthalates such as Terol 250 and 250D, glyceryl tris 12-hydroxy stearate such as Thixcin E available from N.L. Industries, polysaccharides such as Aquathix available from Tennneco Chemicals Company, and certain other fillers such as Bentone 34 available from N.L. Industries and Versamide 335 available from General Mills Chemicals, Inc., of Kankakee, Ill. The amount of filler in the premixed resin component is about 0.5% to about 25%, preferably about 0.5% to about 15%, more preferably about 1% to about 9% relative to the weight of this component.

If the filler component is all placed in either the resin component or the hardener component, greater amounts than indicated above may have to be provided in the single component containing the filler. It is also possible, of course to mix the filler with the resin component and the hardener component at the application site, in which case at least 10%, preferably about 30%, and more preferably about 40% of the filler should be hydrophobic. The amount of filler added either separately or in a single component should be sufficient to provide in the mixture an amount of filler in the range of about 0.5% to about 25%, preferably about 0.5% to about 15% and more preferably about 1% to about 10%, relative to the total weight of the admixed composition.

Another particularly desired characteristic of the filler is that it be a thixotropic agent. Thixotropic agents by definition impart to the mixture a variable viscosity depending on the level of the shear to which the mixture is subjected. The thixotrophy of the composition may be measured by its thixotropic index which is the ratio of its low shear viscosity to its high shear viscosity. The thixotropic index imparted to the composition by the thixotropic agent used should be at least about 1.5, preferably at least about 2.0, as measured in the final adhesive paste composition as ready for application to glue together foundry shapes. Certain surfactants may be added to this mixture, preferably as an ingredient in the resin (Part I) component, so as to increase the thixotropic index of the adhesive paste composition. One such surfactant is a non-ionic coupling agent containing octylphenoxy polyethoxyethanol available as Triton X-100 from Rohm and Haas.

The adhesive paste compositions which are benefited by use of this invention are known to the art and are those which contain certain polyol resin and polyisocyanate combinations. Such polyol/isocyanate adhesive systems are admixed at or about the time of use. Typically, the polyol and polyisocyanate ingredients of such adhesive compositions are sold, shipped and stored in separate packages (i.e., a multiple package molding assembly adhesive) to avoid undesirable deterioration due to premature reaction between the components. Solvents, catalysts, fillers and various optional additives are used in conjunction with these essential ingredients, i.e., used with the polyol resin and the isocyanate.

The first component or package of the binder composition comprises an polyol having at least two hydroxyl groups, and preferably from two to five hydroxyl groups. If desired, mixtures of organic polyols can be employed. Suitable polyols include polyester polyols, polyether polyols, modified polyester polyols, modified polyether polyols, phenol-formaldehyde resins, substituted phenol-formaldehyde resins, polypropylene glycols, glycols, triols, novalak resins, and methylol-terminated phenolic resins.

The polyol resin is preferably a phenolic resin. The phenol reactants employed in making the phenolic resin component may include at least 5 mole percent and preferably about 5 to about 30 mole percent of a alkyl phenol, more preferably nonyl phenol, and most preferably paranonyl phenol. The phenolic resins are substantially free of water and are organic solvent soluble. In addition to containing nonyl phenol, the phenolic component may include any one or more of the phenols which have heretofore been employed in the formation of phenolic resins and which are not substituted at either the two ortho-positions or at one ortho- and the para-position, such unsubstituted positions being necessary for the polymerization reaction. Any one, all, or none of the remaining carbon atoms of the phenol ring can be substituted. The nature of the substituent can vary widely, and it is only necessary that the substituent not interfere in the polymerization of the aldehyde with the phenol at the ortho- and/or para-positions. Substituted phenols that may be employed in the formation of the phenolic resins include: alkyl-substituted phenols, aryl-substituted phenols, cyclo-alkyl-substituted phenols, alkenyl-substituted phenols, alkoxy-substituted phenols, aryloxy-substituted phenols, and halogen- substituted phenols, the foregoing substituents containing from 1 to 26 and preferably from 1 to 12 carbon atoms.

Specific examples of suitable phenols include: phenol, 2,6 xylenol, o-cresol, m-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Multiple ring phenols, such as bisphenol A, are also suitable. Such phenols can be described by the general formula:

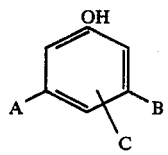

wherein A, B, and C are hydrogen atoms, or hydroxyl radicals, or hydrocarbon radicals, or oxyhydrocarbon radicals, or halogen atoms or combinations of these. A preferred phenol component employed is a mixture of one or more of these phenols with nonyl phenol.

The phenol component is preferably reacted with an aldehyde to form phenolic resins, more preferably benzylic ether resins. The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The methylol-terminated phenolic resins useful in the present invention are resole resins which are organic solvent soluble. The organic solvent soluble resole resins are a well established class of resins the preparation of which is known. However, since the resole resins having a high proportion of orth-ortho methylene linkages are generally the organic solvent soluble resole resins, the majority of the resole resins useful in this invention are prepared from alkyl-substituted phenols wherein the para position is substituted. On the other hand, organic solvent soluble resole resins may also be prepared from phenols unsubstituted in the ortho and para positions by first preparing an ortho-ortho novolac and then reacting the novolac with further formaldehyde under milder conditions to produce a methylol-terminated resin which is an organic solvent soluble resole resin unsubstituted at the para positions. As an illustration of this procedure, a mixture of phenol and formaldehyde wherein the molar ratio of phenol to formaldehyde is greater than 1:1 may be condensed in the presence of an ortho-ortho directing catalyst, such as sodium hydroxide, under alkaline pH, e.g., between 5 and 6, and at a temperature in the neighborhood of 160° C. When essentially no free formaldehyde remains, the excess phenol is removed by vacuum distillation and the resin cooled to the neighborhood of 40° C. to 50° C. Additional formaldehyde is then added and the subsequent exothermic reaction controlled to keep the temperature below about 95° C. This mixture is then rapidly cooled before the resin becomes insoluble, which results in a methol-terminated organic solvent soluble resole resin having essentially no para substitution and being useful in this invention. The disclosures of British Patent Nos. 773,510 and 773,547 are particular pertinent to the above resole resins prepared from phenol unsubstituted in the meta and para positions.

A preferred class of phenolic resins that can be employed in the adhesive compositions of the present invention is described in U.S. Pat. No. 3,485,797 referred to above. The phenolic resins employed in the adhesive compositions also can include either resole or A-stage resins or novolac resins and, when admixed with polyisocyanates and cured by use of catalysts, these resins form adhesives of sufficient strength and other properties to be suitable in industrial applications such as gluing together the parts of a molding assembly for casting metals or plastics. The resole resins are preferred over the novolak resins. The resitole or B-stage resins, which are a more highly polymerized form of resole resins, are generally unsuitable. The phenolic resin employed must be liquid or organic solvent-soluble. Solubility in organic solvent is desirable to achieve uniform distribution of the components in the adhesive admixture.

The substantial absence of water in the polyol resin is desirable in view of the reactivity of the adhesive composition of the present invention with water. The term "non-aqueous" or substantially water-free as employed herein is meant to define polyol resins which contains no more than about 10 percent (10%) water, preferably no more than about 5 percent (5%) water, and more preferably no more than about 1 percent (1%) water based on the weight of the resin. Mixtures of polyol resins can be used.

The polyol resin component of the adhesive composition is, as indicated above, generally employed as a solution in an organic solvent. The nature and the effect of the solvent will be more specifically described below. The amount of solvent used should be sufficient to result in an adhesive composition permitting uniform coating thereof on foundry shapes and uniform reaction of the mixture. The specific solvent concentrations for the polyol resins will vary depending on the type of polyol resin employed and its molecular weight. In general, the solvent concentration will be in the range of up to 80 percent by weight of the resin solution and preferably in the range of about 10% to 60%, more preferably in the range of about 15% to 40%.

The second component or package of the binder composition comprises an aliphatic, cycloaliphatic, or aromatic polyisocyanate having at least 2 and preferably from 2 to 5 isocyanate groups. If desired, mixtures of organic polyisocyanates can be employed. Suitable polyisocyanates include the aliphatic polyisocyanates such as hexamethylene diisocyanate, alicyclic polyisocyanates such as 4,4'-dicyclohexylmethane diisocyanate, and the dimethyl derivatives thereof. Further examples of suitable polyisocyanates are 1,5-naphthalene diisocyanate, triphenylmethane triisocyanate, xylene diisocyanate, and the methyl derivatives thereof, polymethylenepolyphenyl isocyanates, chlorophenylene-2,4-diisocyanate, and the like. Mixtures of isocyanates can be used. Although all polyisocyanates react with the polyol resin to form a cross-linked polymer structure, the preferred polyisocyanates are aromatic polyisocyanates and particularly diphenylmethane diisocyanate, triphenylmethane triisocyanate, and mixtures thereof, such as mondur MR and MR-200 available from Mobay Chemical Corporation of Pittsburgh, Pa.

The polyisocyanate is employed in sufficient concentrations to cause the curing of the polyol resin. In general, the polyisocyanate will be employed in a range of 10 to 500 weight percent of polyisocyanate based on the weight of the polyol resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80 percent by weight of the solution. Most preferably the isocyanate is employed in a stoichiometric amount ± about 20% based on the available hydroxyl groups of the polyol resin.

The difference in the polarity between the polyisocyanates and the polyol resins restricts the choice of solvents in which both components are compatible. Such compatibility is necessary to achieve complete reaction and curing of the adhesive compositions of the present invention. Polar solvents of either the protic or aprotic type are good solvents for the polyol resin, but have limited compatibility with the polyisocyanates. Aromatic solvents, although compatible with the polyisocyanates, are less compatible with the polyol resins. The solvents selected must also be compatible with the filler and the curing agent.

It is therefore preferred to employ combinations of solvents and particularly combinations of aromatic and polar solvents. Suitable aromatic solvents are benzene, toluene, xylene, ethylbenzene and mixtures thereof. Preferred aromatic solvents are mixed solvents that have an aromatic content of at least 90 percent and a boiling point range of 280° to 450° F. The preferred aromatic solvents are blends such as Hi Sol 10 and Hi Sol 15 available from the Industrial Chemical Solvents Division of Ashland Chemical Company of Dulbin, Oh. Suitable polar solvents are generally those which have been classified in the art as coupling solvents and include ketones, esters, alcohols, chlorinated hydrocarbons, glycol ethers, isophorone, 1,1,1-trichoroethane, methylene chloride, furfuryl alcohol, Cellosolve acetate, butyl Cellosolve, butyl Cellosolve acetate, butyl Carbitol, diacetone alcohol, and "Texanol".

Other preferred solvents include liquid dialkyl esters such as dialkyl phthalate of the type disclosed in U.S. Pat. No. 3,905,934, the entire contents of which are incorporated herein by reference. Such preferably have the structure:

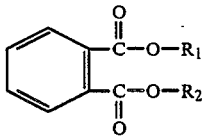

where $R_1$ and $R_2$ are alkyl radicals of 1 to 12 carbon atoms and the total number of carbon atoms in the R groups does not exceed 16. Preferably $R_1$ and $R_2$ are alkyl radicals of 3 to 6 carbon atoms and the total number of carbon atoms in $R_1$ and $R_2$ is between 6 and 12. Thus in the above structural formula, either R group can be methyl, ethyl, n-propyl, isopropyl, n-butyl, isobutyl, n-pentyl, isopentyl, hexyl, isohexyl, heptyl, isoheptyl, octyl, isooctyl, and other isomers of the foregoing. Particular preferred dialkyl phthalates are dibutyl phthalate, dioctyl phthalate, dicapryl phthalate and mixtures thereof.

Other dialkyl esters include dimethyl glutarate such as available from DuPont under the trade designation DBE-5, dimethyl adipate available from DuPont under the trade designation DBE-6, dimethyl succinate, dioctyl adipate, and mixtures of such esters which are available from DuPont under the trade designation DBE, and dialkyl adipates and succinates with alcohols up to 12 carbon atoms. Particularly preferred solvent systems are mixtures of dimethyl succinate, dimethyl glutarate and dimethyl adipate such as DBE and DBE-2. DBE is about 10% to about 25% dimethyl adipate, about 45% to about 65% dimethyl gluterate and about 20% to about 30% dimethyl succinate. DBE-2 is about 20% to about 35% dimethyl adipate, about 65% to about 80% dimethyl gluterate, and up to 3% maximum of dimethyl succinate.

Although three-package systems are contemplated, the binder compositions are preferably to be made available as a two-package system with the polyol resin and curing agent in one package and the isocyanate component in the other package. Broadly described, the adhesive compositions of the present invention comprise organic solvent soluble polyol resins, which may contain benzylic ether structure and/or methylol end groups in non-aqueous systems which have been combined with sufficient polyisocyanate to cross-link the polyol resin and which contain as the curing catalyst a base having a pK value in the range of about 7 to about 12 as determined in a known manner. The determination of pK values of organic compounds may be made in various conventional manners depending upon the nature of the particular organic compound. The pK values of compounds useful as catalysts in this invention may be determined according to methods described by D. D. Perrin in Dissociation Constants of Organic Bases in Aqueous Solution (Butterworths, London 1965).

The pK value is the negative logarithm of the dissociation constant of the base and is a well-known measure of the basicity of a basic material. The higher this number is, the weaker the base. The bases falling within this range are generally organic compounds containing one or more nitrogen atoms. In view of the varying catalytic activity and varying catalytic effect desired, catalyst concentrations will vary widely. In general, the lower the pK value is, the shorter will be the gel and curing times of the paste composition and the faster, more complete will be the cure. Any acidity present in added ingredients such as solvents may affect the catalytic activity. In general, however, catalyst concentrations will range from 0.01% to 10% by weight of the polyol resin.

The catalyst materials include compounds containing at least one nitrogen atom in the ring structure. Specific examples of bases which have pK values within the necessary range include 4-alkyl pyridines wherein the alkyl groups has from one to four carbon atoms, isoquinoline, arylpyridines such as phenyl pyridine, pyridine, acridine, 2-methoxypyridine, pyridazine, 3-chloro pyridein, quinoline, N-methyl imidazole, 4,4-dipyridine, phenyl-propyl pyridine, 1-methylbenzimidazole, and 1,4-thiazine.

Other suitable catalysts include liquid tertiary amines such as triethyl amine, Polycat 77 (available from the Chemical and Agricultural Products Division, Abbott Laboratories, North Chicago, Ill.), liquid diamines such as ethylene diamine and triethylene diamine, morpholines such as N-methyl and N-ethyl morpholine, oleic and formic acid of DMATA, and 1,5-diazabicyclo 5,4,0 undecene 7 (DBU). Particular preferred catalysts for premixing with the resin component (Part I) are blocked DBU compounds such as DBU blocked with formic acid (Polycat 610/50), phenolic acid (Polycat SA-1), and 2-ethylhexanoic acid (Polycat SA-102). The Polycat catalysts referred to are all available from Abbott Laboratories.

All of the foregoing catalysts, either alone or in mixtures thereof, may be mixed with the other components of the adhesive paste composition at the application site. Catalyst concentrations can be in the range of about 0.01% to about 15%, preferably about 1.0% to about 7.0% relative to the weight of the resin component. Where the catalyst is premixed with the resin component away from the application site, its concentration can be in the range of about 0.1% to about 15%, preferably about 0.1% to about 5.0% relative to the weight of the premixed resin component.

Figure 3:
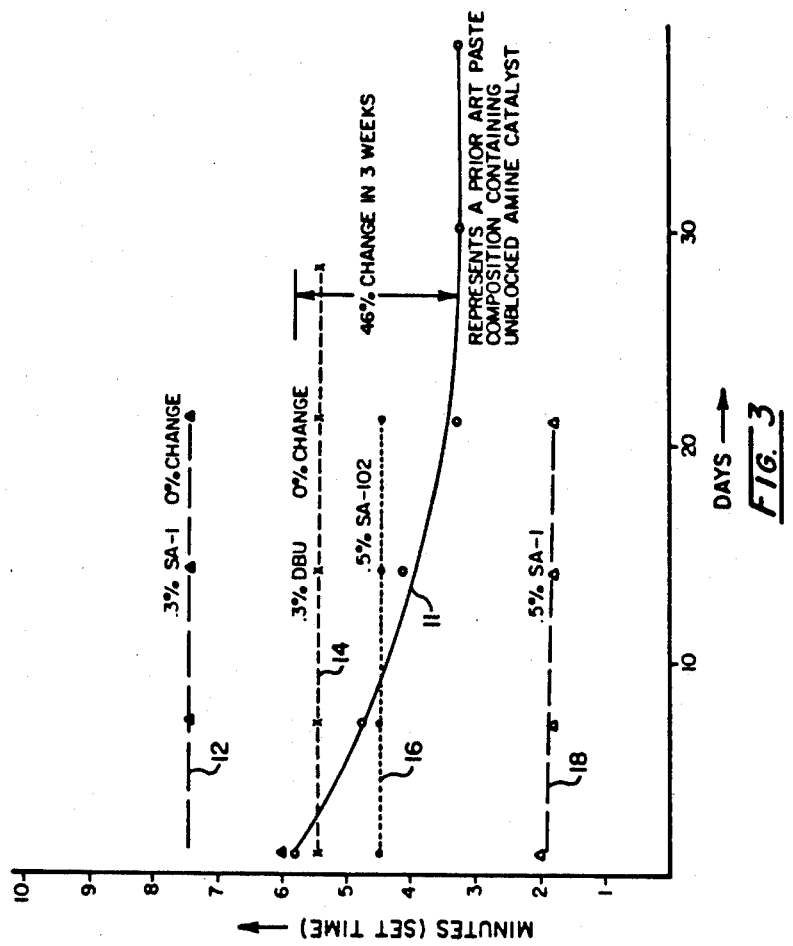
FIG. 3 is a graph illustrating the stability of the cure times provided by the extended shelf life of compositions made in accordance with the invention; and, FIG. 4 is a diagrammatic illustration of an applicator system for applying the adhesive paste of the invention to foundry shapes.
Figure 4:
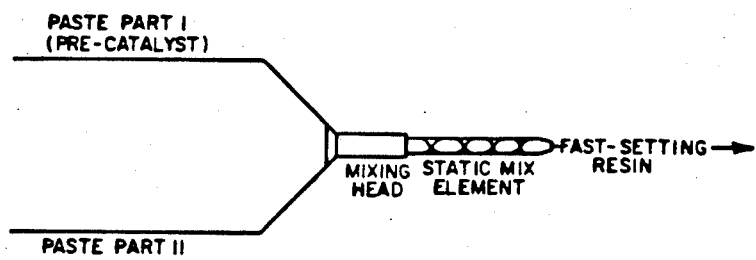

In preparing application site mixtures, the catalyst preferably is first mixed with the resin component, although it can be mixed first with the hardener component or added separately as a third component to a previous or simultaneous mix of the resin and hardener components. For the preparation of a precatalyzed resin component away from the application site, such as at the plant of the manufacturer of a two component system, the catalyst is preferably a blocked DBU. Although other catalyst may be used for precatalyzation of the resin component away from the application site, these compositions may have a significantly shorter shelf life ranging from a few hours to several weeks. For example, an unblocked amine catalyst in a prior art past composition decreased the curing time by as much as 46% in three weeks as shown by line 11 in FIG. 3. In addition to the change in curing time with aging, this composition also exhibited significant foaming characteristics which made the composition undesirable within a few weeks after admixture of the catalyst with the resin component. Such foaming may adversely affect the dimensional stability of the molding assembly. In comparison, the composition of the present invention with a blocked DBU catalyst has a stable shelf life of over four months as determined by an absence of foaming and no significant change in curing time as shown by lines 12, 14, 16 and 18 of FIG. 3 and by the data presented in Table I.

Another important characteristic of the present invention is that the gel, set and cure times of the final admixture can be controllably varied over a significant range by selecting a corresponding catalyst concentration as shown in the bar chart of FIG. 1 and the data presented in Table II. The gel time is preferably about 40% to 60% of the set time, more preferably about 50%. By "set" time is meant the time required for the composition to reach a fully hardened state in a laboratory cup. The new paste composition also rapidly achieves full cure strength as determined by the tensile strength of the paste holding two sand foundry shapes (dog bones) together exceeding the strength of the cured foundry shape binder. By "cure" time is meant the time required to achieve this tensile strength. As shown in column 3 of Table II, final cure strength is achieved within a time period that is only about a factor of 4 to 8 greater than the gel time. This is also shown in FIG. 1 as represented by the bar graph designated as "@70° F.".

In foundry mix compositions for making foundry shapes of the type used in making molding assemblies, the aggregate constitutes the major constituent and the binder constitutes a relatively minor amount. In ordinary sand type foundry applications, the amount of binder is generally no greater than about 10% by weight and frequently within the range of about 0.5 to about 7% by weight based upon the weight of the aggregate. Most often, the binder content ranges from about 0.6 to about 5% by weight based upon the weight of the aggregate in ordinary sand type foundry shapes. For casting of low melting point metals where shakeout and collapsibility are important, about 0.6 to about 1.5% by weight based upon the weight of the aggregate in ordinary sand type foundry shapes is preferably used.

TABLE I

Ratio
PART I 50%
PART II 50%
.1% SA-1 Catalyst (precatalyzed)
Made 1/25/85

| % Catalyst | Test Date | Gel Time | Set Time | Comments |
|---|---|---|---|---|
| .1% SA-1 | 1/29/85 | 2½' | 6' | (a) Glue joint stronger than dog bone<br>(b) No foaming*<br>(c) Easy mixing<br>(d) Good standing power |
| .1% SA-1 | 2/15/85 | 2'45" | 5'45"–6'30" (hard to tell) | No foaming, others1 also same as above |
| .1% SA-1 | 2/26/85 | 2'45–3' | 5½–6½ (hard to tell) Definitely brittle hard at 7' | No foaming, same as above |
| .1% SA-1 | 4/4/85 | 3½' | 5'45" | No foaming, same as above |

*Note: Old composition foams after 25 days, which changes dimentional stability of molds.

TABLE II

GEL TIMES OF NEW 50:50 RATIO CORE PASTE COMPONENTS (ALL APPROX. VALUES)

| | Col. 1 | | Col. 2 | | Col. 3 |
|---|---|---|---|---|---|
| | Cup gel test using Part I @ 90–110° F. (directly after making the Part I in lab mixer) Total amount of Part I and II = 36 grams for test 15 second stirring time in cup | | w/Part I @ 70° F. | | With Part I @ 70° F. then glue dog bones (@ 70° F.) together and set until stronger than core |
| % SA-1 Amine | Gel Time | Set Time | Gel Time | Set Time | |
| .5 | 20 sec. | 40 sec. | 30–35 sec. | 50–55 sec. | 2 min. |
| .4 | 30 sec. | 50 sec. | 40 sec. | 1 min., 15 sec. | 3 min. |
| .32 | 30–40 sec. | 1 min. | 50 sec. | 1 min., 40 sec. | 4 min. |
| .21 | 1 min. | 2 min. | 1 min., 20 sec. | 2 min., 25 sec. | 6–7 min. |
| .12 | 1 min., 35 sec. | 3 min., 45 sec. | 2 min., 20 sec. | 4 min., 10 sec. | 13 min. |
| .09 | 2 min., 20 sec. | 5 min., 45 sec. | 3 min. | 6 min., 30 sec. | 20 min. |
| .05 | 4 min. | around 10 min. | 5 min. | 11 min., 30 sec. | 35–40 min. |

In molds and cores for precision casting applications, the amount of binder is not substantially greater than about 40% by weight and frequently within the range of about 5 to about 20% by weight based upon the weight of the aggregate. When preparing a foundry shape for precision casting, the predominant portion and generally at least about 80% of the aggregate has an average particle size no larger than 150 mesh (Tyler Screen Mesh) and preferably between about 325 mesh and 200 mesh (Tyler Screen Mesh). Preferably at least about 90% by weight of the aggregate for precision casting applications has a particle size no larger than 150 mesh and preferably between 325 mesh and 200 mesh. The preferred aggregates employed for precision casting applications are fused quartz, zircon sands, magnesium silicate sands such as olivine, and aluminosilicate sands.

Although the aggregate employed is preferably dry, moisture of up to about 1 weight percent based on the weight of the aggregate can be tolerated. This is particularly true if the solvent employed is non-water-miscible or if an excess of the polyisocyanate necessary for curing is employed, since such excess polyisocyanate will react with the water.

The foundry mix is molded into the desired shape, whereupon it can be cured so as to retain this shape upon removal from the mold. Curing can be affected by passing a gaseous tertiary amine, such as triethylamine or dimethylethyl amine, through the molded mix as described in U.S. Pat. No. 3,409,579.

The foregoing foundry binder system is best known as the "cold box" process. The adhesive paste of the present invention provides excellent bonding betweening foundry shapes made from such foundry mix compositions and between such foundry shapes and associated metal parts of molding assemblies. Without any intention of being bound by any one theory, it is believed that the adhesive paste adhesion may be enhanced by penetration of the paste into the bound aggregate of the foundry shapes and possibly some cross-linking by residual activity of binder molecules having reactive groups similar to those of the paste composition. However, the new adhesive paste composition also provides excellent adhesion for foundry shapes utilizing other foundry binder systems, such as the hot box process, the warm box process, the no-bake process, the core oil process, and the shell process.

In order to further understand the present invention, the following non-limiting examples concerned with adhesive pastes for gluing together foundry shapes are provided. In these examples and throughout this specification, all parts and percentages are by weight unless the contrary is stated.

EXAMPLE 1

The following is illustrative of a typical procedure which can be employed to prepare phenolic resins suitable for use in accordance with the present invention.

To a clean reactor purged with inert gas charge 63.35 parts of a 99% synthetic phenol and 36.41 parts of flake paraformaldehyde while maintaining an inert gas blanket. With the reactor condensor set for reflux and with the reactor agitator on, charge 0.24 parts of a lead catalyst known as Cem-All which is a blend of solvents and synthetic acids containing about 24% lead by weight in a catalyst composition available from Mooney Chemicals, Inc., of Cleveland, Oh. After obtaining a uniform mixture, turn off the inert gas blanket and heat the reactor to 227° F. to 230° F. (108° C. to 110° C.), maintaining a rate of temperature increase so as to attain this temperature in approximately 1 to 1½ hours. After this temperature is attained, it is held for about 30 minutes while the batch exhibits a mild exotherm. Cooling water may be required to control the batch temperature within the 227° F. to 230° F. range. The temperature should not be allowed to drop below 227° F. during this period as this might cause a loss of the exotherm. After 30 minutes at 227° F. to 230° F., allow the temperature of the batch to rise to 230° F. to 237° F. (112° C. to 114° C.) and hold the temperature in this range for about 60 minutes. Some cooling water may still be required during this period. At the end of this 60 minute holding period, the resin should be clear indicating complete dissolution of the paraformaldehyde. If this not the case, processing should be discontinued because an unclear resin indicates a paraform quality problem or a potentially dangerous overcharge situation.

After 60 minutes at 230° F. to 237° F. and having observed a clear resin, the condensor should be set to distill to a receiver and adequate heat should be applied to raise the temperature of the batch to 257° F. to 259° F. (125° C. to 126° C.). This batch temperature range should be achieved within a 45 to 60 minute period. This is a dehydration step and the batch must be held within the specified range throughout dehydration. At 250° F. during the upheat period, the reactor, condensor and receiver should be sealed. A first refractive index determination should then be made as soon as the batch reaches 250° F., but no more than 60 minutes after the time at which heat was applied at the beginning of the upheat step when the batch was at 235° F. The refractive index is recorded at 15 minute intervals until a test of 1.5800 is obtained. Sample intervals are then decreased to 5 minute periods until the batch reaches a refractive index of 1.5940.

At a refractive index of 1.5940, full cooling and vacuum is applied to the reactor as rapidly as possible and sampling is continued at 2 minute intervals until a refractive index end point of 1.5990 is obtained. This vacuum step may take less than 5 minutes to achieve the desired end point. At the end point of 1.5990, the vacuum is immediately released and cooling is continued as rapidly as possible until a temperature of 220° F. maximum is achieved. The batch is then pumped to a mixing vessel for solvent addition, after which the phenolic resin is suitable for use as the Part I component of the present invention.

EXAMPLE 2

The following is illustrative of a typical procedure which can be employed to prepare a two package system in accordance with the present invention. 40 to 60 parts of the resin component of Example 1 are heated to about 220° F. and mixed with 40 to 60 parts of a solvent such as HiSol 15 (available from Ashland Chemical Company with a boiling point range of 182° C.–204° C.), DBE or DBE-2. The resin and solvent may be blended in a standard laboratory mixing tank. The solvated resin is then blended in a standard laboratory mixer, such as a Hobart N-50 from the Hobart Corporation, of Columbus, Oh., with 0.5 to 25 parts of a filler component, such as Cab-O-Sil N-70-TS fumed silica, and with 0.01% to 10.0% by weight of a premix catalyst, such as Polycat SA-1 or Polycat SA-102 (a blocked DBU compound). Blending is continued until a substantially uniform mixture is obtained. To this mixture also may be added a surfactant such as 0.01% to 1.0% by weight of Triton X-100. This composition is then packaged as Part I of the two part adhesive paste system.

The Part II component is prepared by blending in a Hobart N-50 mixer about 80% to about 99.9% by weight of Mondur MR 200 with about 0.1% to about 20% by weight of a hydrophobic filler, preferably a thixotropic agent such as Cab-O-Sil N-70-TS fumed silica. This mixture is then packaged as the Part II component of the adhesive paste composition of the invention.

The above Part I and Part II components are preferably mixed simultaneously with their application to foundry shapes by conventional mixing and applicator gun equipment. Equipment designed for preparation of liquid silicone rubber may readily be adapted for mixing and application of the adhesive paste of the invention. One such mixing assembly is a model S4-5 meter-mix machine with a model 12004-X applicator gun available from Fluid Automation, Inc., of Wixom, Mich. Another meter, mix and dispense machine usable with the invention is the Posiratio Machine with a hand held Posimixer applicator gun available from Liquid Control Corporation of North Canton, Oh. A completely portable applicator system for mixing and applying the adhesive paste of the invention is a high pressure dispense gun utilizing a single cartridge with two separate chambers, one for the resin component and the other for the hardener component, and having a mixing tube downstream of these two chambers. One such dispensing gun is the Supermix II also available from Liquid Control Corporation.

EXAMPLE 3

The following is a specific example of the preparation of a two package system in accordance with the present invention. 80 parts of the resin component of Example 1 are heated to about 220° F. and preblended by mixing with 7.75 parts of DBE and 12.25 parts of HiSol 10. The resin and solvent are blended in a standard laboratory mixing vessel until the resin is dissolved. 96 parts of this preblend is then blended in a standard laboratory mixer, such as the Hobart N-50, with 2.5 parts of a hydrophillic silica known as M-5 from the Cabot Corporation, 1.5 parts of DBE and 0.35 parts of Polycat SA-1 (a blocked DBU compound). Blending is continued until a substantially uniform mixture is obtained. This composition is then packaged as Part I of the two part adhesive paste system.

The Part II component is prepared by blending in a Hobart N-50 mixer 96 parts by weight of Mondur MR 200 with 4 parts of a hydrophobic thixotropic agent known as Cab-O-Sil N-70-TS fumed silica available from Cabot Corporation. This mixture is then packaged as the Part II component of the adhesive paste composition of the invention.

Upon mixing the Part I and Part II components, good mixing was obtained but the resulting mixture was considered to be too flowable prior to gel. Upon further curing, a hard gel was obtained which did not swell.

EXAMPLE 4

Example 3 is repeated except the M-5 filler is replaced by 2.5 parts of Cab-O-Sil N-70-TS. The characteristics of the admixture of Parts I and II were substantially the same as Example 3 except that the reactivity, i.e., the curing time, was somewhat faster.

EXAMPLE 5

Example 3 is repeated except that the preblend is mixed with 4.5 parts instead of 1.5 parts of DBE. The characteristics of the admixture of Parts I and II were substantially the same as Example 4 except that flowability was improved prior to gel.

EXAMPLE 6

Example 3 was repeated except the M-5 filler of the resin component was replaced by 2.5 parts of Cab-O-Sil N-70-TS, and the N-70-TS filler component of the hardener was replaced by 3 parts of the M-5 filler and the amount of MR-200 increased to 97 parts. The flowability of the mixture of Parts I and II was considered to be excessive in that it did not have sufficient standing power and was too fluid to provide a good seal between mating parts.

EXAMPLE 7

Example 3 is repeated except in the resin component the M-5 filler is replaced by 3 parts of the N-70-TS filler, the amount of DBE changed from 1.5 to 1 part and the amount of SA-1 changed from 0.35 to 0.3 parts. In the hardener component, the MR-200 component was increased to 96.5 parts and the N-70-TS was lowered to 3.5 parts. In this embodiment, both Part I and the Part II had similar viscosities and excellent mixing characteristics. The at rest repose (no shear) and the application viscosity (shear) of the mixture was also excellent. However, the set time was relatively fast, being from 1 to 2 minutes.

EXAMPLE 8

Example 7 is repeated except the amount of premixed catalyst in the resin component was reduced to 0.25 parts of SA-1. The mixing, repose and application characteristics remained excellent, and the set time was about the same as in Example 7.

EXAMPLE 9

Example 7 was again repeated except the amount of catalyst was reduced to about 0.15% SA-1. This amount of catalyst did not significantly change the characteristics of the Example 7 composition.

EXAMPLE 10

Example 7 was again repeated except that the amount of catalyst was reduced to 0.10 parts SA-1. This provided a somewhat slower set time of about 2½ to 3 minutes.

EXAMPLE 11

Example 7 was again repeated except the amount of catalyst in the resin component was reduced to 0.15 parts SA-1 and the amount of filler in the hardener component was increased to 4 parts of N-70-TS. This provided a substantially slower set time relative to Example 7 of about 4 minutes.

EXAMPLE 12

Example 11 was repeated except that the amount of filler in the hardener component was increased to 5 parts N-70-TS. This change resulted in an even slower gel time of about 6 minutes and a set time of about 11 minutes.

EXAMPLE 13

Example 7 was repeated except that the amount of catalyst in the resin component was reduced to 0.06 parts. The gel time of the mixture was somewhat slower, being about 2½ minutes. The composition became rubbery at 4 minutes and hard at 8 minutes (set time) when applied to a dog bone test sample made from a foundry mix. This composition cured on the dog bone sample at about 20.5 minutes. The composition exhibited the same excellent mixing and application characteristics of the composition of Example 7.

EXAMPLE 14

Example 13 was repeated except that the amount of filler in the hardener component was increased to 5 parts N-70-TS. This composition had a gel time of 9.5 minutes, became rubbery at about 25 minutes and hard at about 75 minutes on a dog bone sample. This composition cured on the dog bone sample after about 2½ hours.

EXAMPLES 15–22

In these examples, a preblend for the resin component was prepared in the same manner as in Example 3 except that it contained 79.38 parts of the phenolic resin of Example 1, 7.68 parts of DBE and 12.94 parts of HiSol 15. 97 parts of this preblend were then blended with 3 parts of Cab-O-Sil N-70-TS. To this resin component was added different amounts of SA-1 catalyst as specified along the Y-axis of FIG. 1. The resin component was made up of 97 parts MR-200 and 3 parts of Cab-O-Sil N-70-TS. The resin and hardener components had similar viscosities and were readily mixed to provide an adhesive paste having excellent pumping, application and repose characteristics. The composition cured to a hard gel and exhibited no swelling. The gel time, set time and curing time on dog bones of this composition were tested and the results of these tests are illustrated in FIG. 1.

EXAMPLE 23

In this example, 100 grams of a phenolic resin available from Ashland Chemical Company as Pepset 1600 were mixed with 0.35 grams of SA-1 to provide a resin component. 100 grams of MR-200 and 5 grams of N-70-TS were mixed to provide a hardener component. These Part I and Part II components were then mixed to provide an adhesive paste in accordance with the present invention. This paste composition had good gel characteristics but a fairly low viscosity.

EXAMPLE 24

Example 23 was repeated except 2 grams of Cab-O-Sil N-70-TS filler were added to the resin component. This improved both the gel time and the viscosity characteristics of the Example 23 composition.

EXAMPLE 25

A preblend for the resin component was made up of 85 parts Pepset 1600 and 15 parts of a solvent available as EBPA. 96 grams of this preblend were mixed with 4 grams of Cab-O-Sil N-70-TS and 0.35 grams of SA-1 to provide the resin component. The hardener component was made up of 98 parts of MR-200 and 2 parts of N-70-TS. These Part I and Part II components had excellent mixing and application characteristics and provided a good gel time. This composition provided a rubbery gel.

EXAMPLE 26

In all of the above examples, the invention was utilized as a 2 part adhesive system. The invention also may be utilized as a 3 part adhesive system to be mixed at the application site. In this application, 0.01% to 10% of the catalyst may be preblended in either the Part I or the Part II component, although the catalyst is preferably preblended with the resin component even where such preblending is used at the application site.

The curing agent need not be preblended with either the resin or the hardener component, but the 3 components may be mixed simultaneously in a batch type applicator or in an applicator gun having 3 separate lines feeding into a unitary mixing chamber. In a 3 lines mixing gun, the catalyst is preferably added at the last downstream inlet near the point of discharge of the dispensing gun. In this application, the resin component (Part I) is placed in 1 feed container, the hardener component (Part II) is placed in a second feed container and the catalyst (Part III) is placed in a third feed container. All of these components are thoroughly mixed mechanically in the static mixing tube or chamber of the dispensing gun. Alternatively, these three components may be added to a common flexible plastic bag, kneaded to affect a uniform mixing, and squeezed through a applicator nozzle of this bag type applicator.

An illustrative example of a three part adhesive system for application to foundry shapes is as follows with the mixing of the three components being controlled by mixing ratios: 70 to 30 parts, preferably 55 to 45 parts, of Part I are mixed with 30 to 70 parts, preferbly 45 to 55 parts, of Part II and with 0.01 to 10 parts, preferably 0.05 to 5 parts, of Part III.

The adhesive paste admixture is applied to foundry shapes as a continuous bead or as discontinuous spots or dabs. The coated surfaces of the foundry shapes are then pressed together while the adhesive paste is still workable (within the gel time) and then set aside or held together until the paste "sets", namely, until it has hardened sufficiently to provide such tensile strength that accidental vibration or movement of the molding assembly will not cause dislocation of its parts. Depending on the amount of curing agent (Part III) used, the set time of the paste composition may be varied from about 15 seconds to about 2 hours. An important feature of the invention is that the paste composition remains workable up until its gel time, which may be up to 60% of the overall set time. Once the paste gels, it is no longer workable and the adhered parts of the molding assembly should not be moved until at least 70% or 80% of the tensile strength of the cured paste has been achieved.

What is claimed is:

1. A molding assembly comprising at least two shapes bonded to each other by an effective bonding amount of an adhesive paste comprising in admixture a resin component, a hardener component, a filler component and a curing agent, said resin component including a polyol having at least two hydroxyl groups, said hardener component including a liquid polyisocyanate containing at least two isocyanate groups, said curing agent comprising a base, and said filler component comprising a hydropohobic filler material which is a thixotropic agent, such that the relative weight ratio of resin component to hardener component is from 45:55 to 55:45, the relative weight ratio of curing agent to resin component is from 0.01:99.99 to 15:85, and the relative weight ratio of the hydrophobic filler to hardener component is from 0.5:99.5 to 20:80.

2. The molding assembly of claim 1 in which at least one of said foundry shapes comprises a major amount of a sand aggregate and an effective bonding amount of a binder composition.

3. The molding assembly of claim 1 in which at least one of said foundry shapes of said molding assembly comprises a major amount of aggregate and an effective bonding amount of a binder composition up to about 40% relative to the weight of the aggregate.

4. The molding assembly of claim 3 in which said aggregate is sand and said binder composition comprises a resin comonent and a hardener component, said resin component being (a) an organic solvent soluble benzylic ether resin containing benzylic ether groups, or (b) a methylol-terminated phenolic resin comprising a resole resin which is organic solvent soluble, and said hardener component being a liquid polyisocyanate containing at least two isocyanate groups.

5. A process for the fabrication of a molding assembly which comprises a. making an adhesive paste comprising in admixture a resin component, a hardener component, a filler component, and a curing agent, said resin component including a polyol having at least two hydroxyl groups, said hardener component including a liquid polyisocyanate containing at least two isocyanate groups, said curing agent comprising a base, and said filler component comprising a hydrophobic filler material which is a thixotropic agent such that the relative weight ratio of resin component to hardener component is from 45:55 to 55:45, the relative weight ratio of curing agent to resin component is from 0.01:99:99 to 15:85, and the relative weight ratio of the hydrophobic filler to hardener component is from 0.5:99 to 20:80 and 2. applying said adhesive composition to at least two foundry shapes so as to bond said foundry shapes together as a molding assembly, the mixing of said resin and hardener components, the application of said adhesive composition and the bonding of said foundry shapes together being carried out at ambient temperature.

6. The process of claim 5 in which said curing agent is present in said premixed resin component at the time said premixed resin component is mixed with said premixed hardener component.

7. The process of claim 5 in which at least one of said foundry shapes of said molding assembly comprises a major amount of aggregate and an effective bonding amount of a binder composition up to about 40% relative to the weight of the aggregate.

8. The process of claim 7 in which said aggregate is sand and said binder composition comprises a resin component and a hardener component, said resin component being (a) an organic solvent soluble benzylic ether resin containing benzylic ether groups, or (b) a methylol-terminated phenolic resin comprising a resole resin which is organic solvent soluble, and said hardener component being a liquid polyisocyanate containing at least two isocyanate groups.

9. The process of claim 8 in which said binder composition is hardened by contact with an amine gas in a cold box process.

10. The process of casting a metal comprising:
fabricating a molding assembly in accordance with claim 5;
pouring said metal while in the liquid state into or around said molding assembly;
allowing said metal to cool and solidify so as to provide a molded metal article; and,
separating said molded metal article from said molding assembly.

* * * * *